United States Patent [19]

Dunn

[11] 3,983,826
[45] Oct. 5, 1976

[54] KNOT TYING APPARATUS AND METHOD FOR STATOR LACING MACHINE

[75] Inventor: Thomas M. Dunn, Fort Wayne, Ind.
[73] Assignee: Essex International, Inc., Fort Wayne, Ind.
[22] Filed: Aug. 25, 1975
[21] Appl. No.: 607,212

[52] U.S. Cl. ............................ 112/265; 112/121.2; 29/606
[51] Int. Cl.$^2$ ..................... H01F 41/02; D05B 3/00
[58] Field of Search ................ 112/121.2, 262, 265; 29/606, 596, 203 R

[56] References Cited
UNITED STATES PATENTS

| | | | |
|---|---|---|---|
| 3,344,760 | 10/1967 | Muskulus et al. | 112/121.2 |
| 3,659,337 | 5/1972 | Gawthrop et al. | 29/606 |
| 3,862,493 | 1/1975 | Habegger et al. | 112/121.2 |

Primary Examiner—Werner H. Schroeder
Assistant Examiner—Peter Nerbun

[57] ABSTRACT

An apparatus and method for anchoring the starting end of the lacing cord and knotting the finishing end following lacing of the end turns of a dynamoelectric machine stator winding using the lacing machine and method which laces the cord about the end turns in a stitch pattern having double looped stitch intervals with a loop connecting each successive double looped stitch, such as that described and illustrated in U.S. Pat. No. 3,659,337. The starting end of the lacing cord is clamped at a point spaced from the dispensing end of the cord feeding tube in a direction opposite the direction of indexing the stator core member during the lacing operation. At the completion of the formation of the first double looped stitch during which the starting end is laced under a part of the stitch and thus anchored, the stator is indexed with the starting end being pulled through the clamp under tension and the end turn lacing operation proceeds in the normal manner around the stator with the starting end being laced under and anchored by the double loop stitches. At the conclusion of the normal lacing operation, a final loop of the lacing cord is pulled through the last one of the connecting loops, the section of the cord which extends between the dispensing end of the feeding tube and the radially inner side of the end turns is cut thereby forming a finishing end of the cord and a new starting end, and the finishing end is pulled through the last connecting loop to form a knot, the new starting end being again clamped preparatory to a new lacing operation.

12 Claims, 26 Drawing Figures

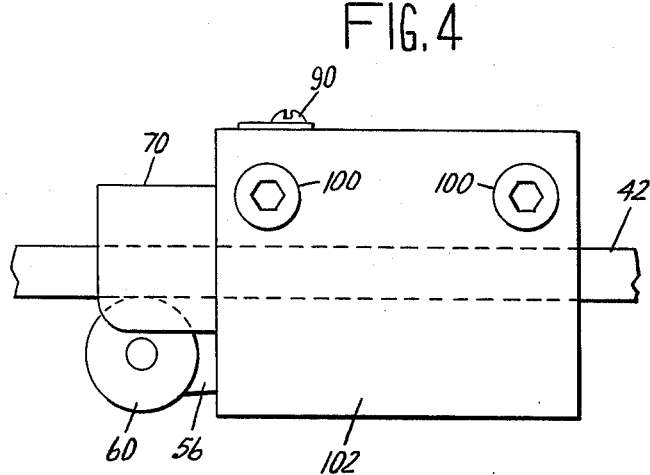
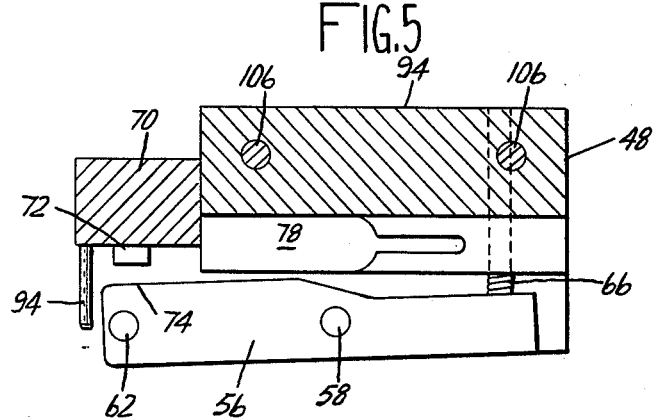
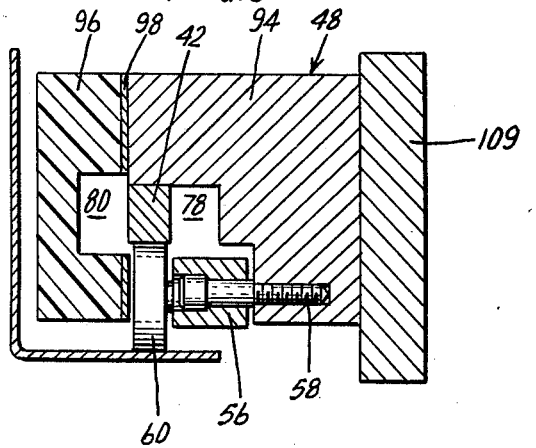

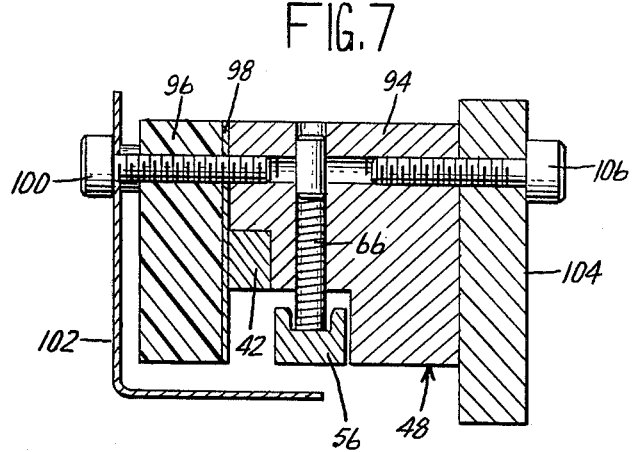
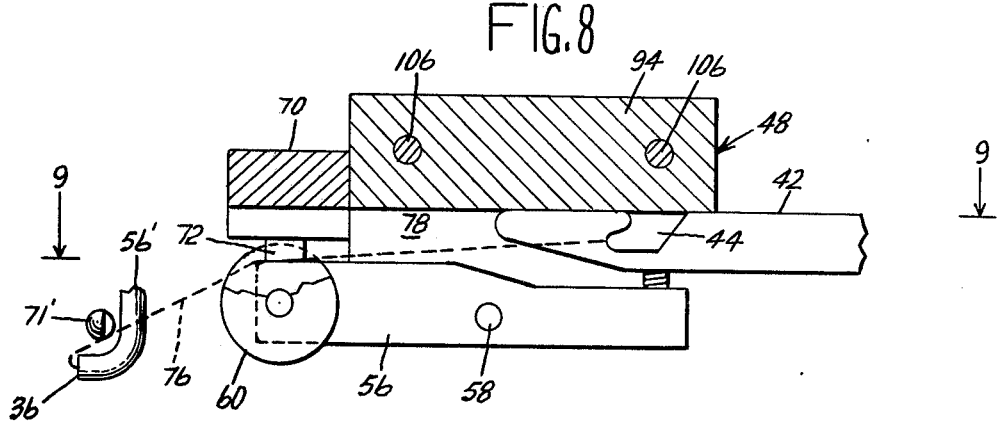
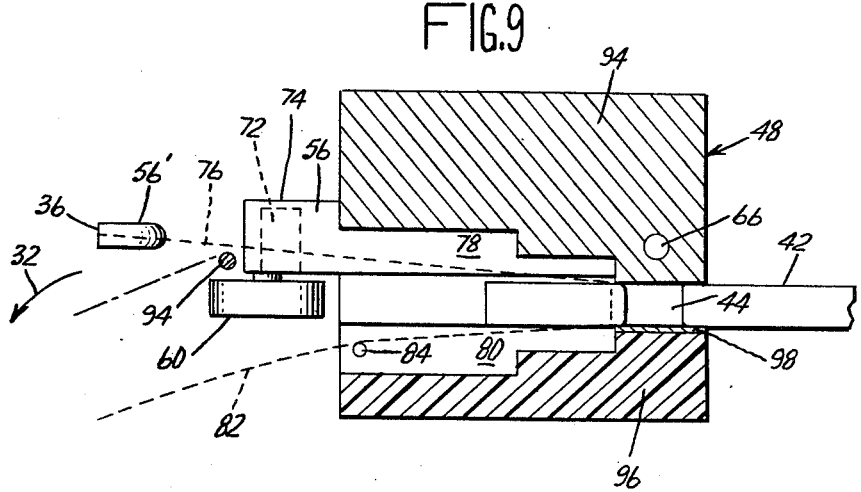

ic machine stator winding, and more particularly to an apparatus and method for anchoring the starting end of the lacing cord and automatically tying a knot in the finishing end following the lacing operation.

KNOT TYING APPARATUS AND METHOD FOR STATOR LACING MACHINE

BACKGROUND OF THE INVENTION

1. Field of the Invention

This invention relates generally to apparatuses and methods for lacing the end turns of a dynamoelectric machine stator winding, and more particularly to an apparatus and method for anchoring the starting end of the lacing cord and automatically tying a knot in the finishing end following the lacing operation.

2. Description of the Prior Art

Gawthrop, et al., U.S. Pat. No. 3,659,337 discloses an apparatus and method for lacing the end turns of a dynamoelectric machine stator winding in a stitch pattern having double looped stitched intervals with a loop connecting each successive double looped stitch. Fields, et al., U.S. Pat. No. 3,813,754 discloses indexing mechanism for the apparatus disclosed in the aforesaid Gawthrop et al patent. Muskulus et al. U.S. Patent No. 3,344,760 discloses lacing apparatus which provides a different double loop stitch pattern.

SUMMARY OF THE INVENTION

In the use of the lacing apparatus disclosed in the aforesaid Gawthrop et al patent, the starting end of the lacing cord is clamped during the entire lacing operation and, at the completion of the lacing operation, it is necessary manually to tie the starting and finishing ends of the cord, as shown in FIG. 21 of that patent. There are instances when it is desired to lace in thermal protective devices or to arrange lead wires, and the clamping mechanism of the aforesaid Gawthrop et al patent interferes with such operations. Further, it is desirable to eliminate the aforesaid tying operation previously required at the completion of the lacing cycle.

The apparatus of the present invention may be used with prior apparatus for lacing the end turns of a dynamoelectric machine stator winding which includes means for supporting a wound stator core member to be laced and means for indexing the core member in a given direction by predetermined angular increments. A cord feeding member is provided for supplying lacing cord from a source thereof and having a cord dispensing end, and an elongated cord pulling member is provided having a distal end with a hook portion thereon. First means is provided for moving the pulling member in a first linear path which extends generally radially with respect to the core member and intermediate one end face thereof and respective end turns between a first position with the distal ends spaced radially outwardly from the end turns and a second position with the distal end spaced radially inwardly therefrom, and second means is provided for moving the dispensing end of the feeding member in a second path between first and second positions respectively adjacent the first and second positions of the distal ends of the pulling member, the second path extending over the end turns. Means are provided for synchronizing the first and second moving means so that the feeding and pulling members lace the cord about the end turns in a stitch pattern having double looped stitch intervals with a loop connecting successive double loop stitches. The invention, in its broader aspects, provides mechanism for anchoring the starting end of the cord and for tying a knot at the finishing end. Means are provided for clamping with predetermined tension the starting end of the lacing cord which extends from the dispensing end of the feeding member in the first position thereof, the clamping means being spaced from the dispensing end in its first position in a direction generally opposite the indexing direction so that the starting end is laced under a part of the first loop stitch of the stitch pattern. The starting end is pulled through the clamp under tension during indexing of the stator following completion of the first double loop stitch. Means are provided for pulling in the opposite direction a length of cord which extends from the dispensing end of the feeding member at a position in the second path intermediate the first and second positions thereof to the radially inner side of the end turns, and means are provided for cutting that length of cord intermediate the pulling means and the inner side of the end turns to form a finishing end of the cord which may then be pulled radially outwardly through the last one of the connecting loops thereby to form a knot. The section of cord extending from the dispensing end to the pulling means passes through the clamping means to form a new starting end of the cord.

It is accordingly an object of the invention to provide apparatus for use with a stator lacing machine for anchoring the starting end of the lacing cord at the beginning of the lacing operation and for tying a knot in the finishing end at the conclusion of the lacing operation.

Another object of the invention is to provide a method of anchoring the starting end of the lacing cord at the beginning of the lacing of the end turns of a dynamoelectric machine stator winding and tying a knot in the finishing end at the conclusion of the lacing operation.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a fragmentary side view taken generally along the line 4—4 of FIG. 2;

FIG. 5 is a fragmentary cross-sectional view taken generally along the line 5—5 of FIG. 2;

FIG. 6 is a side cross-sectional view taken generally along the line 6—6 of FIG. 2;

FIG. 7 is a side cross-sectional view taken generally along the line 7—7 of FIG. 2;

FIG. 8 is a fragmentary cross-sectional view similar to FIG. 2 but showing the cord pulling member in its retracted position and the clamp arm in its cord-clamping position;

FIG. 9 is a fragmentary cross-sectional view taken generallly along the line 9—9 of FIG. 8;

DESCRIPTION OF THE PREFERRED EMBODIMENT

Figure 1:
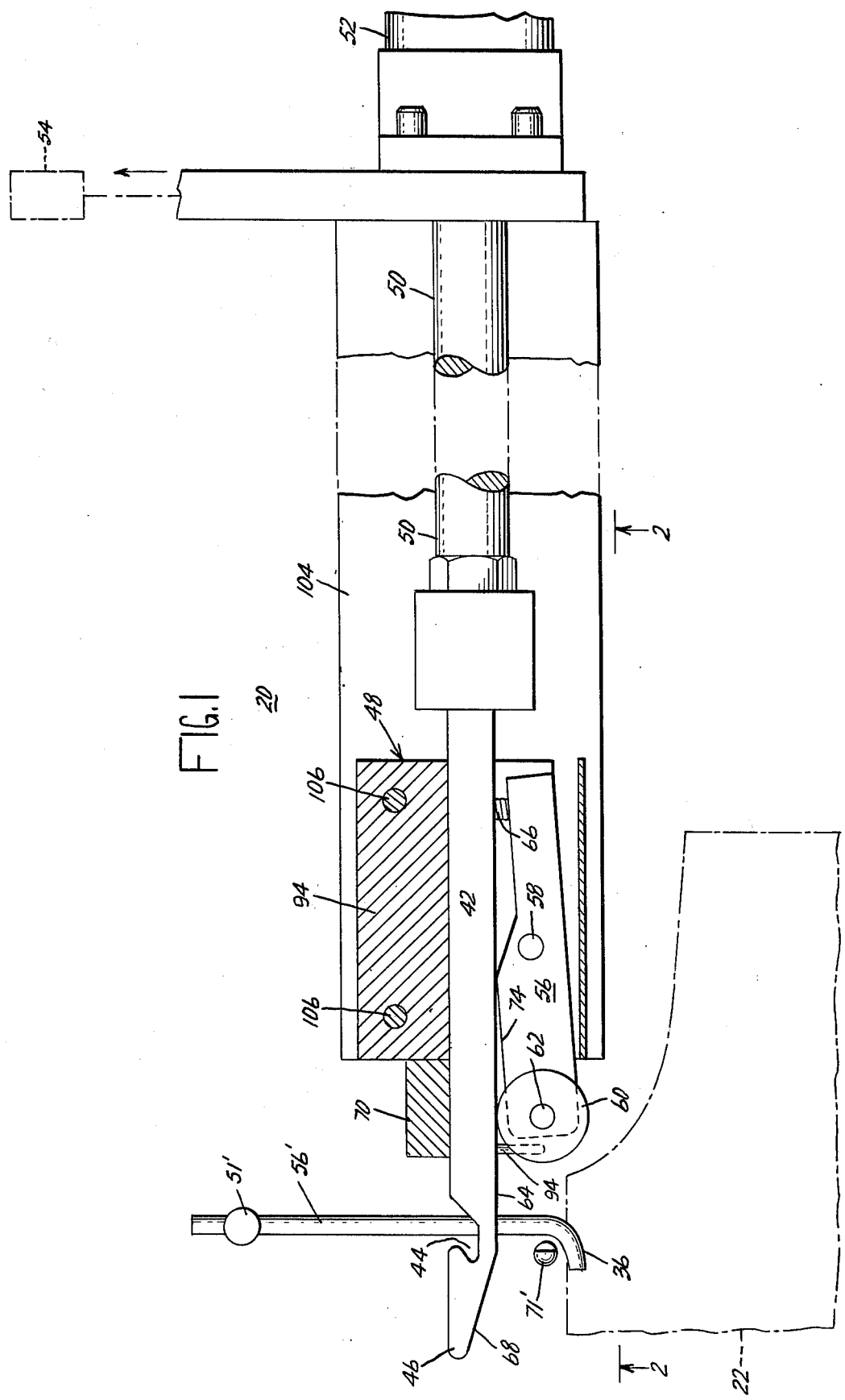
FIG. 1 is a side view, partially in cross-section, showing the apparatus of the invention.
Figure 2:
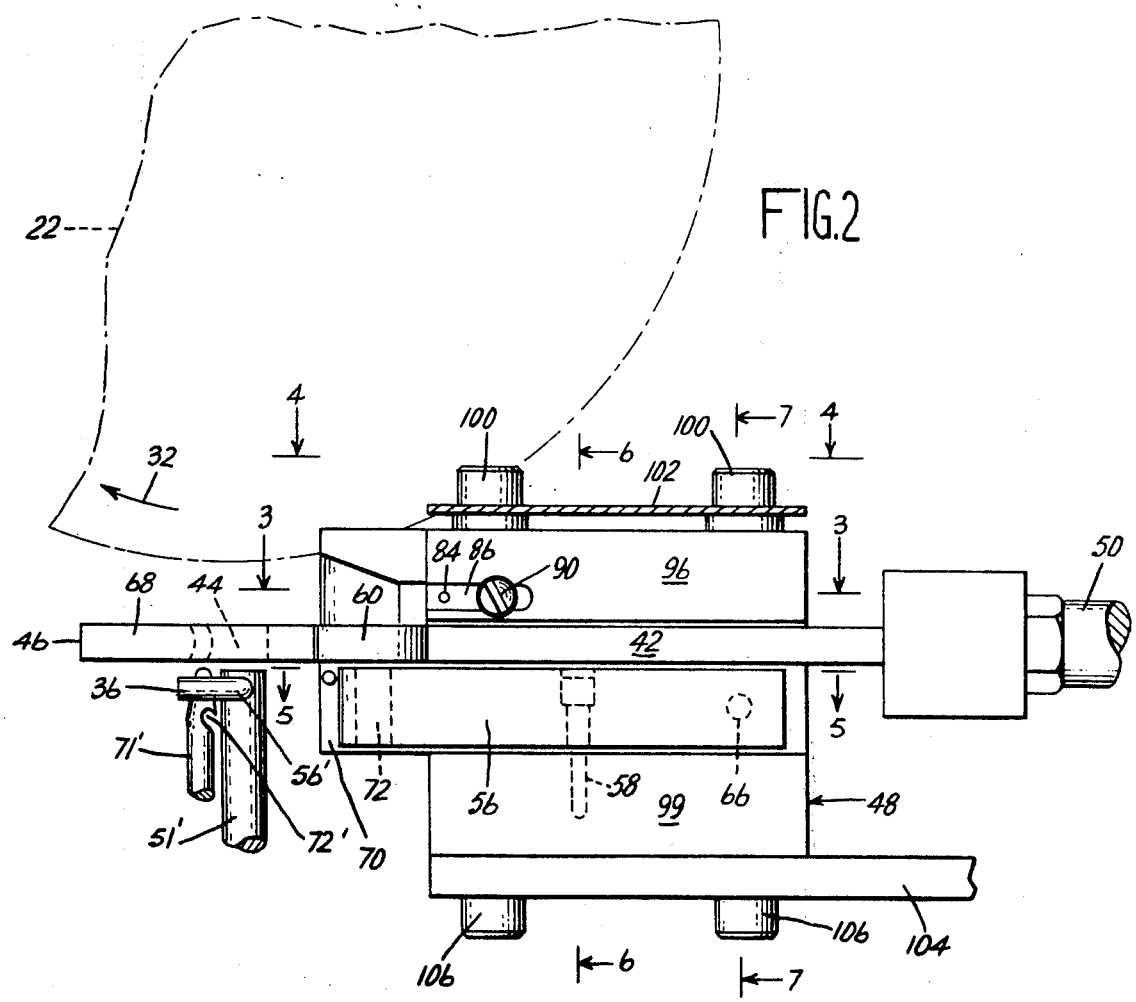
FIG. 2 is a bottom view of the apparatus of FIG. 1.
Figure 3:
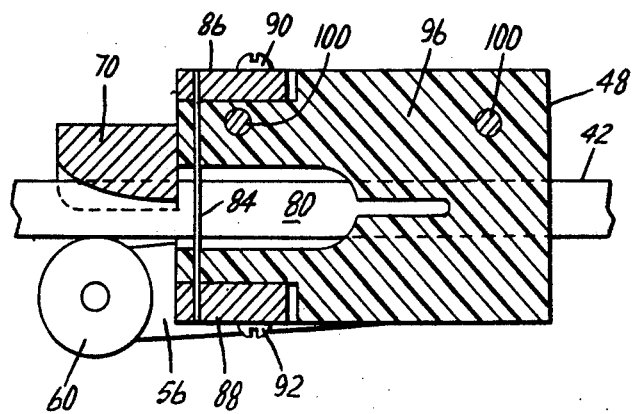
FIG. 3 is a fragmentary cross-sectional view taken generally along the line 3—3 of FIG. 2.

Referring now to FIGS. 1–10 of the drawings in which the primed reference numerals are used to designate the same elements as in the aforesaid Grawthrop U.S. Pat. No. 3,659,337, there is shown, generally indicated at 20, the apparatus of the invention for anchoring the starting end and tying the finishing end of the lacing cord used for tying the end turns 24 (FIG. 10) which extends from upper end face 26 of stator core member 22. It will be understood that similar apparatus (not shown) is provided for anchoring the starting end and tying a knot in the finishing end of lacing cord used for lacing the end turns which extends from the lower end face 28 of stator core member 22. Stator core member 22 is adapted to be supported by member 30 and to be indexed in the direction shown by arrow 32 in predetermined angular increments by suitable indexing mechanism as shown in dashed lines at 34.

The lacing apparatus of the aforesaid Gawthrop et al. U.S. Pat. No. 3,659,337 includes cord feeding tube 56' mounted on arm 51' and having cord-dispensing end 36, and cord pulling needle 71' having hook 72' at its distal end. The mechanism of the aforesaid Gawthrop et al patent moves needle 71' in a linear path shown by the dot-dash line 38 which extends generally radially of the stator core member and intermediate end face 26 and end turns 24 between a first position 71'-1 spaced radially outwardly from stator core member 22, as shown in solid lines in FIG. 10, and a second position 71'-3 spaced radially inwardly from stator core member 22 as shown in dashed lines. The mechanism of the aforesaid Gawthrop, et al. patent also moves dispensing end 36 of cord feeding tube 56' in a second path shown by the dot-dash line 40 in FIG. 10 between a first position 36-1 adjacent hook 72' in its first position, as shown in solid lines in FIG. 10, and a second position 36-4 adjacent hook 72' in its second position, as shown in dashed lines, path 40 of dispensing end 36 passing over end turns 24. The mechanism of the aforesaid Gawthrop, et al patent synchronizes the movement of needle 71' and cord feeding tube 56' to lace cord around end turns 24 in a stitch pattern having double looped stitched intervals with loops connecting adjacent double looped stitches, as shown in FIG. 21 of the aforesaid Gawthrop, et al patent.

Apparatus 20 includes elongated cord pulling hook member 42 having hook 44 formed therein adjacent its distal end 46 and being slidably mounted in block 48 for linear movement by piston rod 50 of hydraulic cylinder 52 between an extended position, as shown in FIGS. 1–7, and a retracted position as shown in FIGS. 8 and 9. Apparatus 20 together with arm 51', core feeding tube 56' and needle 71' are adapted to be raised and lowered between an operative position, as shown in FIG. 1, and an inactive position, by suitable mechanism as shown in dashed lines at 54, thereby to permit positioning a wound stator core member on support 34, and removing the laced stator core member therefrom. It will be understood that the lower cord anchoring and knot tying assembly and cord feeding tube and needle assembly are not similarly relatively movable with respect to stator core member 22.

Clamp arm 56 is pivotally mounted in block 48 by pivot pin 58 and has roller 60 rotatably mounted at its outer end by pin 62. Roller 60 engages lower surface 64 of cord pulling member 42 and is held in engagement therewith by spring 66 acting between block 48 and the rear end of clamp arm 56. Tappered cam surface 68 joins bottom surface 64 of cord pull member 42 to distal end 46. In the forward position of cord pull member 42, clamp arm 56 is cammed to the open position by engagement of roller 60 bottom surface 64. In the retracted position of cord pull member 42, clamp arm 56 is biased by spring 66 to the cord-clamping position, spring 66 functioning to apply predetermined tension on cord 76.

Clamp block 70 is secured to block 48 and extends forwardly therefrom over clamp arm 56. Clamp block 70 has clamping pad 72 secured thereto which, in the clamping position of clamp arm 56, engages upper surface 74 adjacent the forward end thereof thereby to clamp length 76 of lacing cord which extends therebetween from distal end 36 of cord feeding tube 56' to hook 44 of cord pull member 42 in its retracted position, as shown in FIGS. 8 and 9. Block 48 has cavity 78 formed therein on one side of cord pull 42 thereby to accommodate the length of cord 76 extending from dispensing end 36 of feeding tube 66' through clamp 72, 74 to hook 44 of cord pull member 42 in its retracted position, as best seen in FIG. 9. Block 48 has another cavity 80 formed therein on the other side of cord pull member 42 to accommodate the length of cord 82 which extends from hook 44 of cord pull member 42 in its retracted position to the radially inner side of end turns 24, as will hereinafter be more fully described. It will now be observed that the length of cord 76 is clamped by clamp 72, 74 at a point spaced from dispensing end 36 of cord feeding tube 56' in a direction generally opposite the direction of indexing as shown by the arrow 32.

Heater wire 84 is attached to electrode members 86, 88 and extend through cavity 80. Heater wire 84 is adapted to be heated by current flowing therethrough from a suitable source of voltage connected to terminals 90, 92. Length of cord 82 (FIG. 9) passes over heater wire 84 which, when energized, causes heater wire to sever or cut-off cord length 82 by burning.

Figure 10:
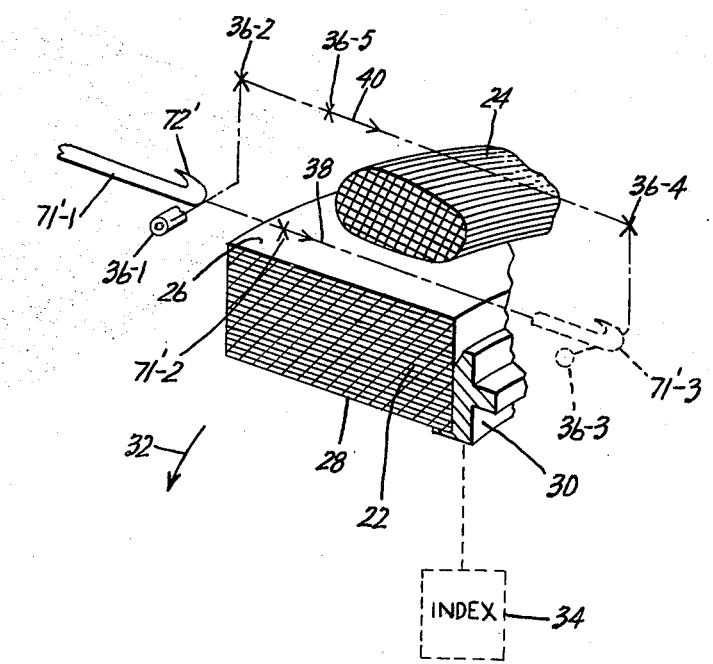
FIG. 10 is a fragmentary view in perspective showing the paths of motion of the needle and dispensing tube of the lacing apparatus.

Pin 94 extends downwardly from clamp block 70 and serves to guide cord 76 from clamp 72, 74 as dispensing end 36 of cord feeding tube 56' is moved from its first position 36-1 to its second position 36-3 in path 40 (FIG. 10).

In a specific embodiment, block 48 comprises two parts 94, 96. Part 96 is formed of molded plastic insulating material and has a thin sheet of metal 98 adhered thereto to form a bearing surface for cord pulling member 42. It will be seen that cavity 80 is formed in part 96 and sheet 98. Parts 94, 96 are secured together by threaded fasteners 100 which also secure guard member 102 to part 96. Apparatus 20 is secured to mounting plate 104 by threaded fasteners 106.

OPERATION

Figure 11A:
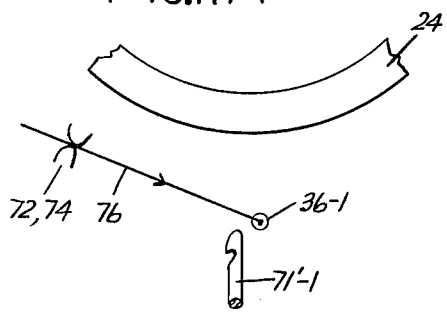
FIG. 11 A through J, schematically show the method of the invention in anchoring the starting end of the lacing cord.
Figure 11B:
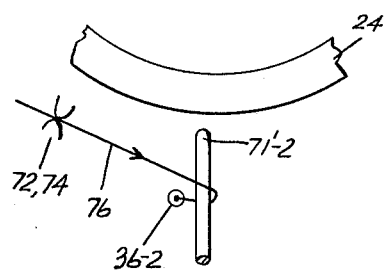

Referring now to FIG. 11A, needle 71' and dispensing end 36 of cord feeding tube 56' are shown in the positions at the beginning of a lacing cycle, i.e., needle 71' in the first or rearmost position 71'-1 of its path of movement 38 and dispensing end 36 in the first position 36-1 of its path of movement 40, starting end 76 of the lacing cord extending from dispensing end 36 upwardly to clamp 72, 74. Referring now to FIG. 11B, needle 71' is moved radially inwardly in path 38 to point 71'-2 (FIG. 10) and dispensing end 36 is moved to position 36-2 in its path 40 thereby looping starting end 76 around needle 71'.

Figure 11C:
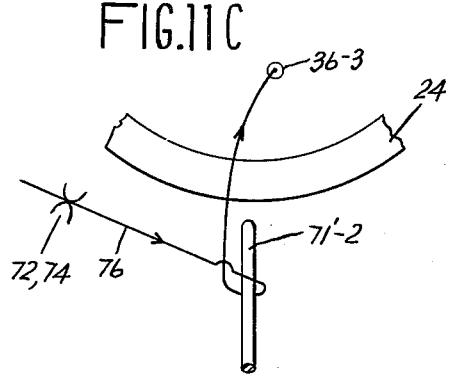
Figure 11D:
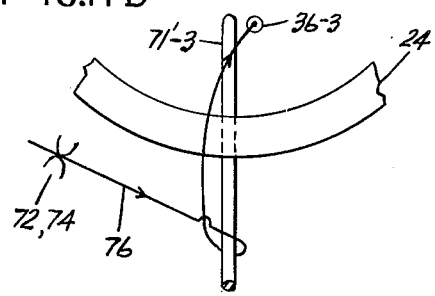
Figure 11E:
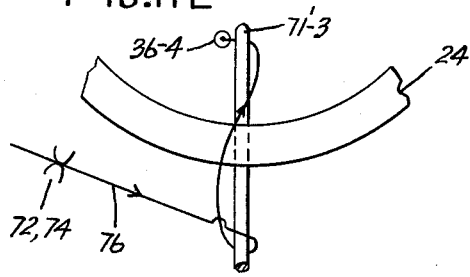
Figure 11F:
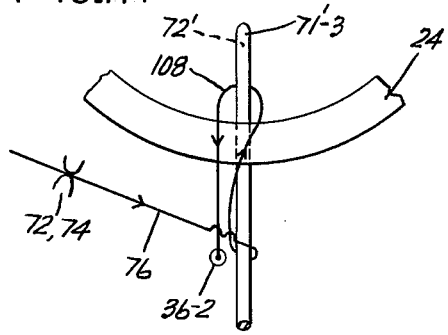

Referring now to FIGS. 11C and D, dispensing end 36 is then moved inwardly in its path 40 over end turns 24 to its second position 36-3 and needle 71' is then moved radially inwardly in its path 38 between end face 26 of core 22 and end turns 24 to its second position 71'-3 thereby passing under the cord extending from dispensing end 36. Referring now to FIGS. 11E and F, dispensing end 36 is then moved to its position 36-2 through its position 36-4 in its path 40 thereby forming loop 108 under needle 71' which is still in its second, radially inner position 71'-3.

Figure 11G:
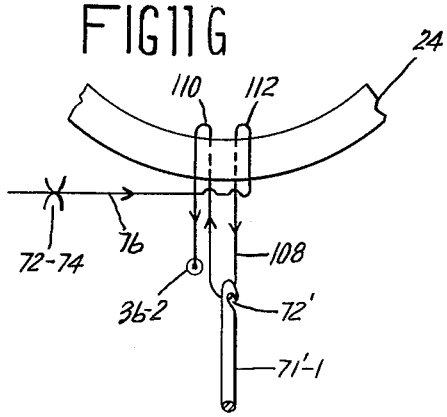
Figure 11H:
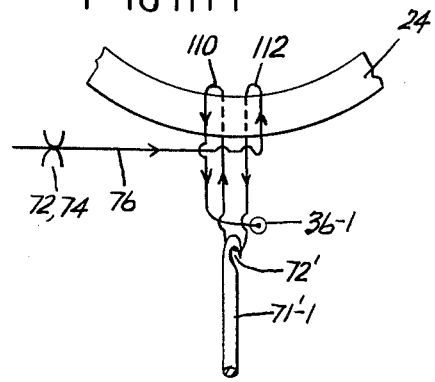
Figure 11:
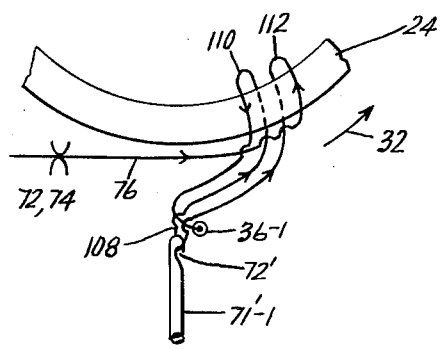
Figure 11:
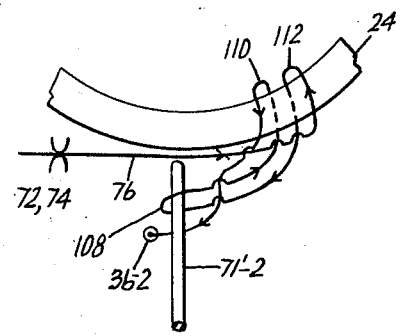

Referring now to FIGS. 11G and H, needle 71' is then moved radially outwardly in its path 38 to its first position 71'-1, hook 72' engaging loop 108 and pulling it under end turns 24 to form loop stitches 110, 112, dispensing end 36 then being moved to its first position 36-1. It will be observed that starting end 76 passes under and is anchored by one side of loop stitch 110. Needle 71 is rotated by 90° to position hook 72' as shown in FIGS. 11G, H.

Referring now to FIGS. 11I and J, stator core member 22 is now indexed in direction 32 preparatory to forming the next double loop stitch, needle 71' is rotated by 90° to free hook 72' from loop 108 and is moved forwardly to its positioin 71'-2, and dispensing end 36 is moved to its position 36-2. Starting end 76 is pulled, under tension, through clamp 72, 74 during the indexing operation thereby insuring tension on the first stitches and firmly anchoring the starting end of the cord. It will now be observed that loop 108 still embraces needle 71' but is free of hook 72' and will form the first connecting loop upon the lacing of the next double loop stitch. Lacing of the end turns 24 now continues in the manner described in the aforesaid Gawthrop, et al. patent, it being observed that starting end 76 will also be anchored by the next successive double loop stitch.

Figure 12E:
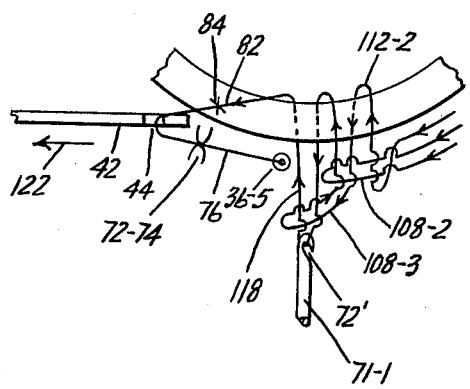
FIG. 12, A through F, schematically show the method of the invention in tying a knot in the finishing end of the lacing cord.
Figure 12F:
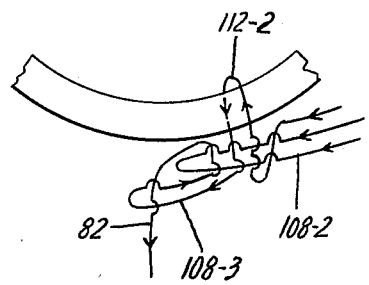
Figure 12A:
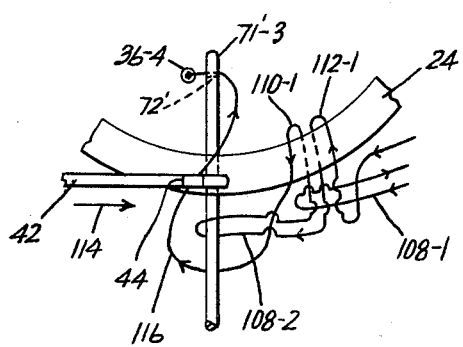
Figure 12B:
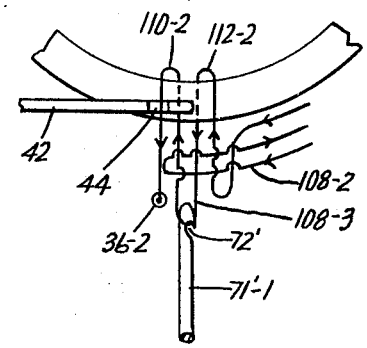

Referring now to FIGS. 12A and 12B, at the completion of the lacing cycle, cord pulling member 42 is moved outwardly as shown by arrow 114, needle 71' is moved to its second position 71'-3 and dispensing end 36 is moved to its position 36-4 with a length of cord 116 thus passing under cord pulling member 42. Dispensing end 36 is then moved to its position 36-2 and needle 71' is moved radially outwardly in path 38 to its first position 71'-1 thereby pulling a new loop 108-3 through connecting loop 108-2 to form double stitch loops 110-2 and 112-2.

Figure 12C:
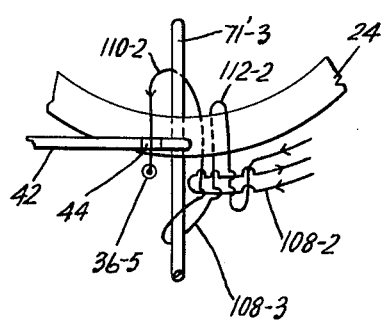
Figure 12D:
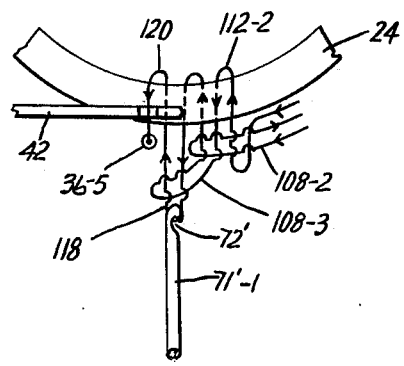

Referring now to FIG. 12C, dispensing end 36 is now moved forwardly in its path 40 to position 36-5 thereby to loosen loop 110-2 and needle 71' is moved forwardly to its second positon 71'-3 thereby passing over loop 110-2. Referring to FIG. 12D, needle 71' is now moved outwardly in its path 38 to its first position 71'-1 with its hook 72' pulling the loop 110-2 under end turns 24 and through connecting loop 108-3 to form a new loop 118 with a length of cord 120 extending from dispensing end 36 to the radially inner side of end turns 24.

Referring now to FIG. 12E, cord pulling member 42 is then moved inwardly as shown by arrow 122 to its retracted position (FIGS. 8 and 9), hook 44 engaging length of cord 120 (FIG. 12D) and pulling it outwardly in a direction opposite the indexing direction 22 to form lengths of cord 76, 82 as shown in FIG. 9. Movement of cord pulling member 42 to its retracted position actuates clamp 72, 74, as above described thereby to clamp a new starting end of a cord 76. Heater wire 84 is then energized to sever cord length 82 from starting end 76.

Referring now to FIG. 12F, upon raising apparatus 20, cord feeding tube 56' and needle 71' to their inactive positions preparatory to removing the laced stator core member 22 from support 30, it will be seen that finishing end 82 of lacing cord will be pulled through loop 108-3 and cinched thereby tying a knot at the finishing end. It will be readily seen that removing the laced stator core member 22 from support 30 will similarly result in pulling the corresponding finishing end of the cord used for lacing the lower end turns through the corresponding connecting loop.

While there have been described above the principles of this invention in connection with specific apparatus, it is to be clearly understood that this description is made only by way of example and not as a limitation to the scope of the invention.

What is claimed is:

1. In apparatus for lacing the end turns of a dynamoelectric machine stator winding including means for supporting a wound stator core member and indexing the same in a given direction by predetermined angular increments, a cord feeding member for supplying lacing cord from a source thereof and having a cord dispensing end, an elongated cord pulling member having a distal end with a hook portion thereon, first means for moving said pulling member in a first linear path extending generally radially with respect to the core member and intermediate one end face thereof and respective end turns between a first position with said distal end spaced radially outwardly from said end turns and a second position with said distal end spaced radially inwardly from said end turns, second means for moving said dispensing end of said feeding member in a second path between first and second positions respectively adjacent said first and second positions of said distal end of said pulling member, said second path extending over said end turns, and means for synchronizing said first and second moving means whereby said feeding and pulling members lace said cord about said end turns in a stitch pattern having double looped stitch intervals with a loop connecting each successive double loop stitch; mechanism for anchoring the starting end of the cord and for tying a knot at the finishing end comprising means for clamping with predetermined tension the starting end of the lacing cord which extends from said dispensing end of said feeding member in the first position thereof, said clamping means being spaced from said dispensing end in said first position thereof in a direction generally opposite said indexing direction whereby said starting end is laced under a part of the first loop stitch of said stitch pattern, means for pulling in said opposite direction a length of cord which extends from said dispensing end at a position in said second path intermediate said first and second position thereof to the radially inner side of said end turns, and means for cutting said length of cord intermediate said pulling means and said inner side of said end turns to form a finishing end of said cord whereby said finishing end may be pulled radially outwardly through the last one of said connecting loops thereby to form a knot, the section of cord extending from said dispensing end to said pulling means passing through said clamping means thereby to form a new starting end.

2. The apparatus of claim 1 wherein said pulling means is movable between a first cord-engaging position and a second cord-pulled position, said clamping means being movable to a first open position in response to movement of said pulling means to its first position, and a second cord-clamping position in response to movement of said pulling means to its second position.

3. The apparatus of claim 2 wherein said cord extends from said pulling means in its second position to said inner side of said end turns past said cutting means.

4. The apparatus of claim 3 wherein said cutting means comprises a heatable element.

5. The apparatus of claim 3 wherein said pulling means comprises an elongated member having a distal end with a hook formed thereon adjacent thereto, and means for moving said last-named member linearly between said first and second positions.

6. The apparatus of claim 5 wherein said elongated member has a cam surface formed thereon, said clamping means comprising a pivoted lever member having means cooperating with said cam surface for moving said lever member between said first and second positions thereof in response to movement of said elongated member between said first and second positions thereof.

7. The apparatus of claim 6 wherein said lever member is positioned on one side of said elongated member, said cooperating means comprising a roller mounted on said lever member, said cutting means comprising a heatable wire positioned on the other side of said elongated member.

8. In a method of lacing the end turns of dynamoelectric machine stator winding including the steps of moving an elongated cord pulling member having a distal end with a hook portion thereon in a first linear path extending generally radially with respect to the core member and intermediate one end face thereof and respective end turns between a first position with said distal end spaced radially outwardly from said end turns and a second position with said distal end spaced radially inwardly from said end turns, moving a cord feeding member which supplies lacing cord from a source thereof and which has a cord dispensing end in a second path between first and second positions respectively adjacent said first and second positions of said distal end of said pulling member, said second path between said first and second positions thereof extending over said end turns, synchronizing said moving steps thereby to lace said cord about said end turns in a stitch pattern having double looped stitch intervals, and indexing the stator core member in a given direction upon completion of each double loop stitch to form a loop connecting each successive double loop stitch; the improvement comprising the steps of: clamping the starting end of the lacing cord which extends from said dispensing end of said feeding member in said first position thereof at a point spaced from said dispensing end in a direction generally opposite said indexing direction, moving said feeding and pulling members in their respective paths thereby to lace a first double loop stitch with said starting end anchored under a part thereof, indexing said stator core member in said given direction by a predetermined angular increment thereby to form a said connecting loop while pulling said starting end against predetermined tension, continuing said moving and indexing steps to lace the end turns of said winding whereby said starting end is laced under and anchored by said stitches, repeating said moving steps a final time to form a final double loop stitch, moving said pulling means to pull a final loop from the length of cord which extends from said dispensing end at a point in said second path intermediate said first and second positions thereof to the radially inner side of said end turns radially outwardly through the last one of said connecting loops, cutting the section of cord which extends between said dispensing end and the radially inner side of said end turns to form a finishing end and a new starting end, and pulling said finishing end through said last connecting loop to form a knot.

9. The method of claim 8 comprising the further step of clamping said new starting end at a point speced in said opposite direction from said dispensing end in said first position thereof.

10. The method of claim 8 comprising the further step of, following said last-named moving step and before said cutting step, pulling said section of cord in said opposite direction to form another loop, said cutting step being at a point on said other loop.

11. The method of claim 10 comprising a further step of clamping another point on said other loop whereby said new starting end is clamped following said cutting step.

12. The method of claim 11 wherein said cutting step comprises burning said cord with a heated element.

* * * * *